United States Patent
Schlangen et al.

(10) Patent No.: US 11,866,023 B2
(45) Date of Patent: Jan. 9, 2024

(54) NOISE MITIGATING HYDRAULIC CONTROL UNIT ASSEMBLY FOR A VEHICLE BRAKING SYSTEM

(71) Applicant: BWI (Shanghai) Co., Ltd., Shanghai (CN)

(72) Inventors: Trevor Matthew Schlangen, Moraine, OH (US); Adam Michael Osswald, Moraine, OH (US)

(73) Assignee: BWI (SHANGHAI) CO., LTD., Shanghai (CN)

( * ) Notice: Subject to any disclaimer, the term of this patent is extended or adjusted under 35 U.S.C. 154(b) by 324 days.

(21) Appl. No.: 17/234,151

(22) Filed: Apr. 19, 2021

(65) Prior Publication Data

US 2022/0332298 A1    Oct. 20, 2022

(51) Int. Cl.
*B60T 8/40* (2006.01)
*B60T 17/04* (2006.01)
(Continued)

(52) U.S. Cl.
CPC .......... *B60T 8/4068* (2013.01); *B60T 17/04* (2013.01); *F15B 21/008* (2013.01);
(Continued)

(58) Field of Classification Search
CPC ........ B60T 8/4068; B60T 17/04; B60T 13/16; F15B 21/008; F16K 17/0433;
(Continued)

(56) References Cited

U.S. PATENT DOCUMENTS

| 4,472,940 A | 9/1984 | Kubota |
| 4,998,609 A | 3/1991 | Nix et al. |
(Continued)

FOREIGN PATENT DOCUMENTS

| CN | 102072323 A | 5/2011 |
| CN | 102741599 A | 10/2012 |
(Continued)

OTHER PUBLICATIONS

Machine translation of DE 102016201595A1 (Year: 2016).*
(Continued)

*Primary Examiner* — Patrick C Williams
(74) *Attorney, Agent, or Firm* — William H. Honaker; Dickinson Wright PLLC

(57) ABSTRACT

A blow-off metering valve for a hydraulic control unit assembly of a brake system including a valve seat. The valve seat includes a wall that extends about an axis between a first end and a second end. The wall defines a passage that extends axially between the first and second ends for transmitting a fluid through the valve seat. An annular flange extends axially from the second end of the wall toward the first end of the wall and tapers radially inwardly. A blocking member is axially movable toward and away from the annular flange for selectively creating a seal at the passage. A biasing element biases the blocking member toward the annular flange. The annular flange terminates at a distal end that is radially spaced from the wall. The annular flange defines at least one flow channel that extends axially for allowing fluid to bypass the blocking member.

17 Claims, 5 Drawing Sheets

(51) Int. Cl.
   *F15B 21/00* (2006.01)
   *F16K 17/04* (2006.01)
   *B60T 13/16* (2006.01)

(52) U.S. Cl.
   CPC ........... *F16K 17/0433* (2013.01); *B60T 13/16* (2013.01); *F16K 17/0406* (2013.01); *F16K 2200/3053* (2021.08); *F16K 2200/402* (2021.08)

(58) Field of Classification Search
   CPC ......... F16K 17/0406; F16K 2200/3053; F16K 2200/402
   See application file for complete search history.

(56) References Cited

U.S. PATENT DOCUMENTS

| | | |
|---|---|---|
| 5,921,636 A | 7/1999 | Roberts |
| 6,164,336 A | 12/2000 | Pasquet et al. |
| 6,203,117 B1 | 3/2001 | Starr et al. |
| 6,641,230 B2 | 11/2003 | Gegalski et al. |
| 7,661,769 B2 | 2/2010 | Kajita et al. |
| 9,096,200 B2 | 8/2015 | Zeoli et al. |
| 9,637,100 B2 | 5/2017 | Reiner et al. |
| 9,758,142 B2 | 9/2017 | Doh |
| 9,855,938 B2 | 1/2018 | Speer |
| 9,896,075 B2 | 2/2018 | Her et al. |
| 9,969,372 B2 | 5/2018 | Song |
| 10,011,254 B2 | 7/2018 | Her |
| 10,399,547 B2 | 9/2019 | Gaertner et al. |
| 10,421,444 B2 | 9/2019 | Yang et al. |
| 10,688,979 B2 | 6/2020 | Leiber et al. |
| 2010/0116364 A1* | 5/2010 | Koyama ................ F16K 47/10 137/535 |
| 2012/0227837 A1* | 9/2012 | Lee .................... F16K 27/0209 137/511 |
| 2016/0312807 A1 | 10/2016 | Kleitsch et al. |
| 2017/0138490 A1 | 5/2017 | Haeusser et al. |
| 2017/0240155 A1 | 8/2017 | Ganzel et al. |
| 2018/0224008 A1* | 8/2018 | Gresset ................... F16K 17/06 |
| 2021/0016754 A1* | 1/2021 | Keyl ..................... F04B 53/121 |

FOREIGN PATENT DOCUMENTS

| | | | |
|---|---|---|---|
| CN | 102785655 A | | 11/2012 |
| CN | 103388705 A | | 11/2013 |
| CN | 102741599 B | | 3/2014 |
| CN | 106414192 A | | 2/2017 |
| CN | 109863068 A | | 6/2019 |
| DE | 10110417 A1 | | 10/2001 |
| DE | 102007049152 A1 | | 4/2009 |
| DE | 102016201595 A1 | * | 8/2017 |
| KR | 101996853 B1 | | 7/2019 |
| WO | 2011097395 A2 | | 8/2011 |
| WO | 2020012426 | | 1/2020 |

OTHER PUBLICATIONS

Examination Report dated Oct. 31, 2022, for counterpart Indian patent application No. 202134055663.
First Office Action and Search Report dated Mar. 24, 2022 for counterpart Chinese patent application No. 202110629724.2, along with machine EN translation downloaded from EPO.

* cited by examiner

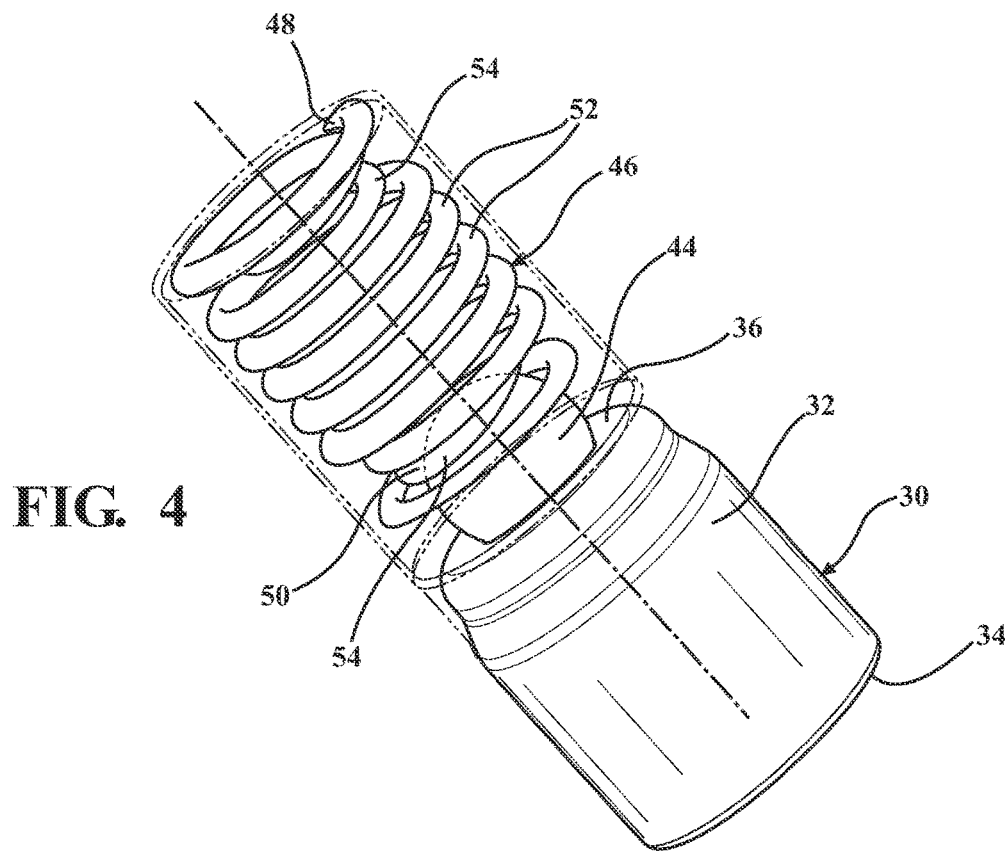
FIG. 4
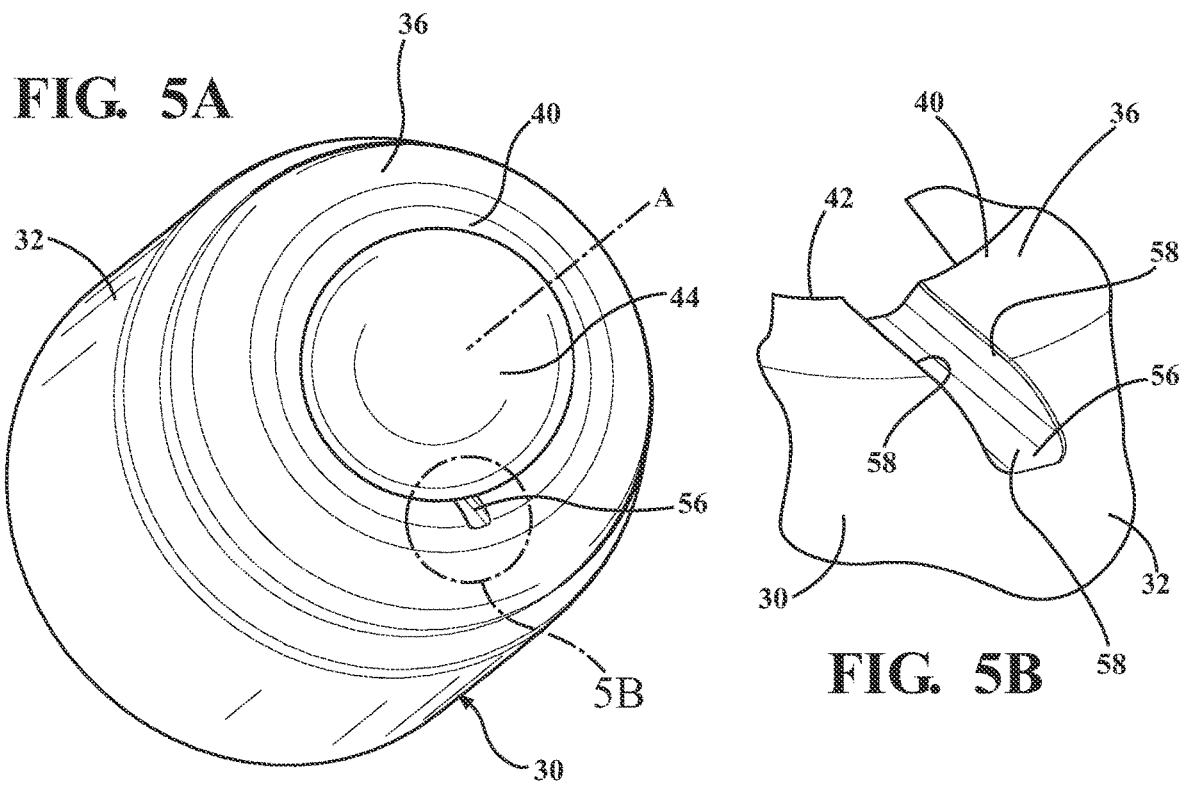
FIG. 5A
FIG. 5B

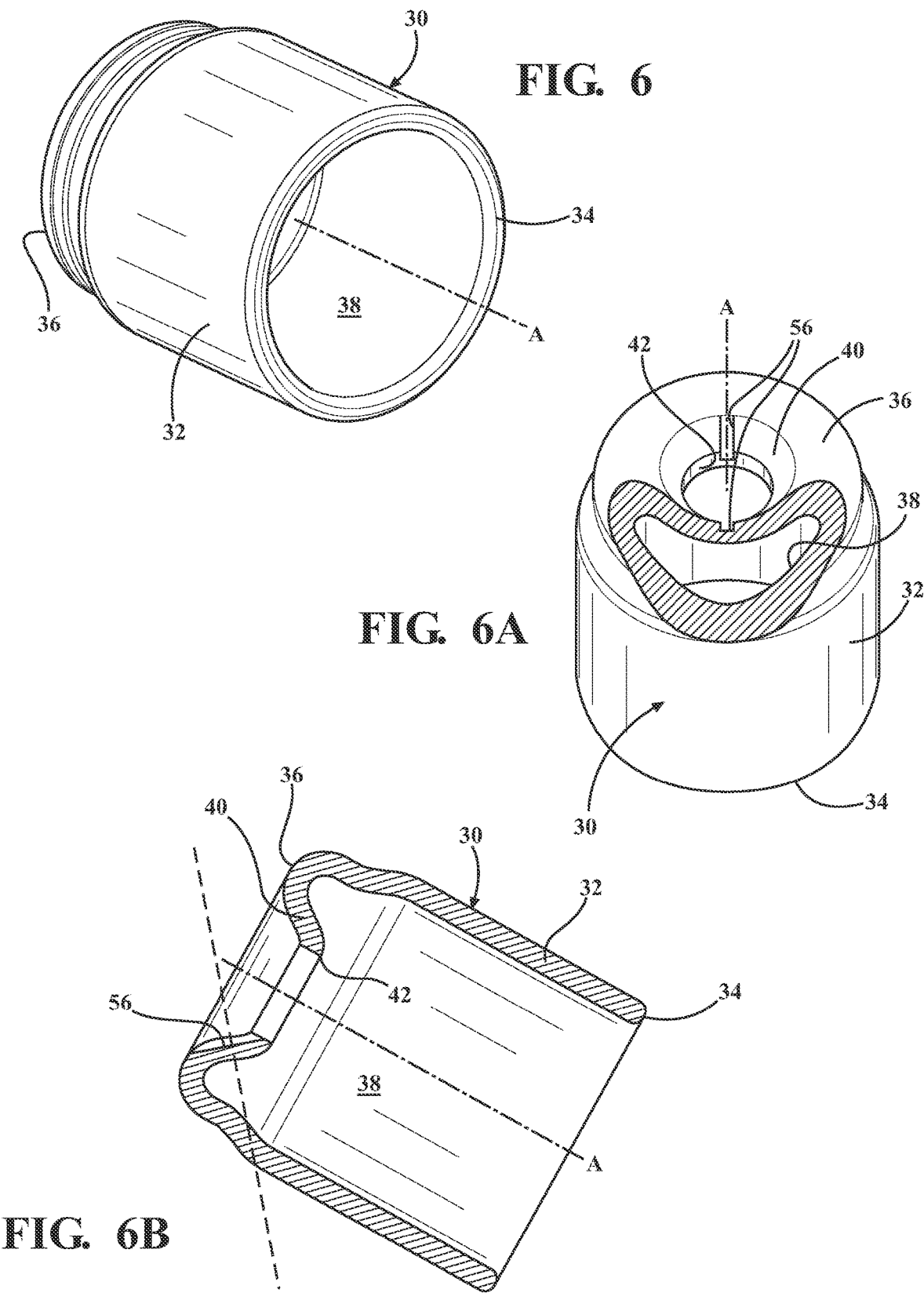

NOISE MITIGATING HYDRAULIC CONTROL UNIT ASSEMBLY FOR A VEHICLE BRAKING SYSTEM

TECHNICAL FIELD

The present disclosure generally relates to a hydraulic control unit assembly for a braking system of a vehicle. More particularly, the present disclosure relates to a hydraulic control unit assembly including a low cost and simple arrangement of a blow-off metering valve configured to mitigate pump noises.

BACKGROUND

Hydraulic control unit assemblies are known for controlling hydraulic brake pressure at brake cylinders of vehicles for providing a braking effect. Such assemblies are typically in fluid communication with a master brake cylinder and an associated pump for receiving a pressurized fluid at an inlet, and in fluid communication with wheel brake cylinders at an outlet. Hydraulic control unit assemblies also typically include various valves and other components for selectively controlling hydraulic brake pressure at the wheel brake cylinders to provide a desired braking effect. It is known for hydraulic control unit assemblies to include a blow-off metering valve for mitigating pump noises by always allowing a small amount of fluid to pass between the inlet and outlet in order to suppress reciprocating pump pulses while also allowing increased flow during high pressure emergency situations via movement of a spring-biased blocking member.

Known blow-off metering valves require complicated and expensive machining operations to provide the aforementioned variable flow capabilities. Accordingly, there remains a need for improvements to hydraulic control unit assemblies and associated blow-off metering valves.

SUMMARY

According to an aspect of the disclosure, a blow-off metering valve is provided for a hydraulic control unit assembly of a brake system of a vehicle for reducing noise from a pump. The blow-off metering valve includes a valve seat for being located in a bore of the hydraulic control unit assembly. The valve seat includes a wall that generally has a sleeve shape and extends about an axis and extends axially between a first end and a second end. The wall defines a passage extending axially between the first and second ends for transmitting a fluid through the valve seat. An annular flange extends axially from the second end of the wall toward the first end of the wall and tapers radially inwardly to define an annular flange. A blocking member is axially aligned with the annular flange and axially movable toward and away from the annular flange for creating a seal to inhibit the flow of fluid through the passage of the valve seat when the blocking member engages the annular flange. A biasing element biases the blocking member toward the annular flange. The annular flange terminates at a distal end that is radially spaced from the wall. The annular flange defines at least one flow channel that extends axially for allowing fluid to bypass the blocking member when the blocking member engages the annular flange.

According to another aspect of the disclosure, a hydraulic control unit assembly is provided for controlling hydraulic brake pressure at a brake cylinder. The hydraulic control unit assembly includes a housing that defines at least one bore defined by an inner wall and extending between an inlet and an outlet, wherein the inlet is for being connected with a pump, and wherein the outlet is for being connected to a brake cylinder. The hydraulic control unit assembly also includes a blow-off metering valve for reducing noise from the pump located in the bore. The blow-off metering valve includes a valve seat for being located in a bore of the hydraulic control unit assembly. The valve seat includes a wall that generally as a sleeve shape and extends about an axis and extends axially between a first end and a second end. The wall defines a passage that extends axially between the first and second ends for transmitting a fluid through the valve seat. An annular flange extends axially from the second end of the wall toward the first end of the wall and tapers radially inwardly to define an annular flange. A blocking member is axially aligned with the annular flange and is axially movable toward and away from the annular flange for creating a seal to inhibit the flow of fluid through the passage of the valve seat when the blocking member engages the annular flange. A biasing element biases the blocking member toward the annular flange. The annular flange terminates at a distal end that is radially spaced from the wall. The annular flange defines at least one flow channel that extends axially for allowing fluid to bypass the blocking member when the blocking member engages the annular flange.

Accordingly, the arrangement of the blow-off metering valve maintains noise mitigation with the flow channel while also eliminating unwanted restriction when the system requires more flow with the arrangement of the blocking member and biasing element. Furthermore, because the distal end of the annular flange is radially spaced from the wall, a gap is provided between the annular flange and the wall, thus providing a simple, light-weight and easy to assemble valve seat because the wall may easily be bent during production to create the annular flange.

According to another aspect of the disclosure, a blow-off metering valve is provided for a hydraulic control unit assembly of a brake system of a vehicle for reducing noise from a pump. The blow-off metering valve includes a valve seat for being located in a bore of the hydraulic control unit assembly. The valve seat includes a generally sleeve-shaped wall that extends about an axis and extends axially between a first end and a second end. The wall defines a passage that extends axially between the first and second ends for transmitting a fluid through the valve seat. An annular flange extends axially from the second end of the wall toward the first end of the wall and tapers radially inwardly to define an annular flange. A blocking member is axially aligned with the annular flange and is axially movable toward and away from the annular flange for creating a seal to inhibit the flow of fluid through the passage of the valve seat when the blocking member engages the annular flange. A compression spring biases the blocking member toward the annular flange. The compression spring includes a plurality of windings. The plurality of windings include a plurality of outer windings and a plurality of inner windings. The outer windings have a smaller radius than the inner windings.

Accordingly, the arrangement of the outer and inner windings eliminates spring stack and allow fluid to more easily pass through the spring. The elimination of spring stack protects a modulator and other components from damage in the event of large displacement of the blocking member during high pressure scenarios. Additionally, the tapering annular flange and inner windings self-align/center the blocking member over the passage.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 4 is a perspective view of the blow-off metering valve illustrating an arrangement of the biasing element compressing a blocking member against a valve seat;

FIG. 5A is a perspective view of the blocking member engaging the valve seat of the blow-off metering valve;

FIG. 5B is a perspective magnified view of the valve seat of FIG. 5A illustrating an arrangement of a flow channel on the valve seat;

FIG. 6 is a perspective view of the valve seat;

FIG. 6A is a perspective cutaway view of the valve seat, illustrating the location and orientation of the flow channel, and an embodiment of an additional flow channel;

FIG. 6B is a side, cross-sectional view of the valve seat;

DESCRIPTION OF THE ENABLING EMBODIMENT

Figure 1:
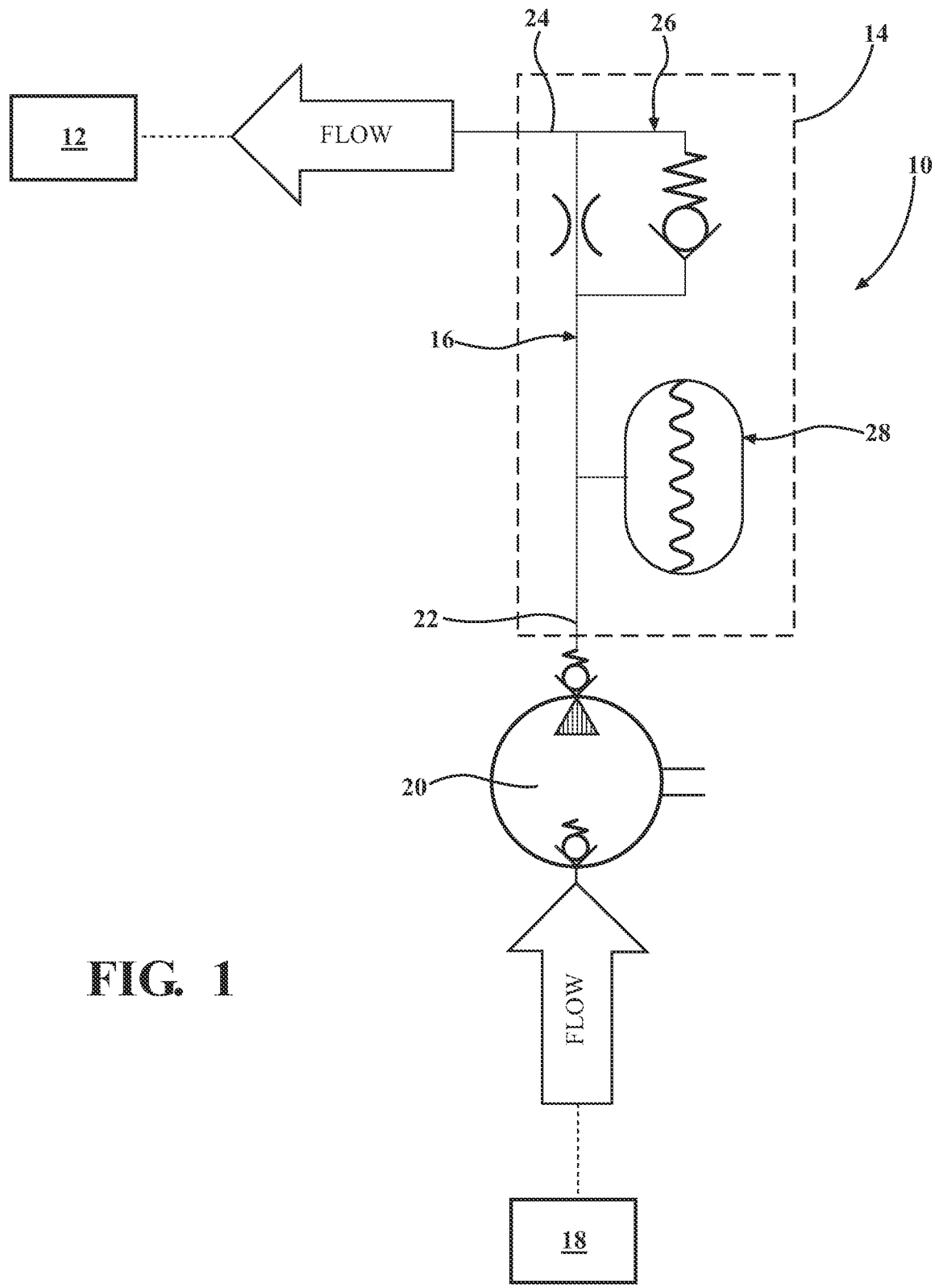
FIG. 1 is a schematic diagram of a hydraulic control unit according to an aspect of the disclosure.

Referring to the figures, wherein like numerals indicate corresponding parts throughout the several views, a hydraulic control unit assembly 10 for controlling hydraulic brake pressure to one or more wheel brake cylinders 12 is generally shown. More particularly, as illustrated, the hydraulic control unit 10 includes a housing 14 that defines one or more bores 16 defined by an inner wall 17 that are in fluid communication with a master brake cylinder 18 and pump 20 at an inlet 22, and with the wheel brake cylinders 12 at an outlet 24. The bores 16 receive a fluid, such as a hydraulic brake fluid for actuating the wheel brake cylinders 12.

Furthermore, the hydraulic control unit 10 may contain various control valves and other components for selectively controlling the hydraulic brake pressure at the wheel brake cylinders 12 for providing a desired braking effect.

As further shown, a blow-off metering valve 26 is provided along the bore 16 adjacent to the outlet 24 for dampening flow pulsations from the pump 20 to provide a uniform brake fluid flow at the outlet 24. More particularly, the blow-off metering valve 26 suppresses reciprocating pulses from the pump 20 and increases a maximum flow capability of the hydraulic control unit 10. Furthermore, a damper assembly 28 is located along the bore 16 between the inlet 22 and the blow-off metering valve 26 for receiving fluid during pulsation peaks from the pump 20 and releasing the fluid between pulsation peaks for leveling out a temporal pressure progression. As such, the damper assembly 28 reduces a pressure differential at the blow-off metering valve 26. The arrangement of the blow-off metering valve 26 and damper assembly 28 maintains noise mitigation with the blow-off metering valve 26 while also when system requires more flow.

Figure 2:
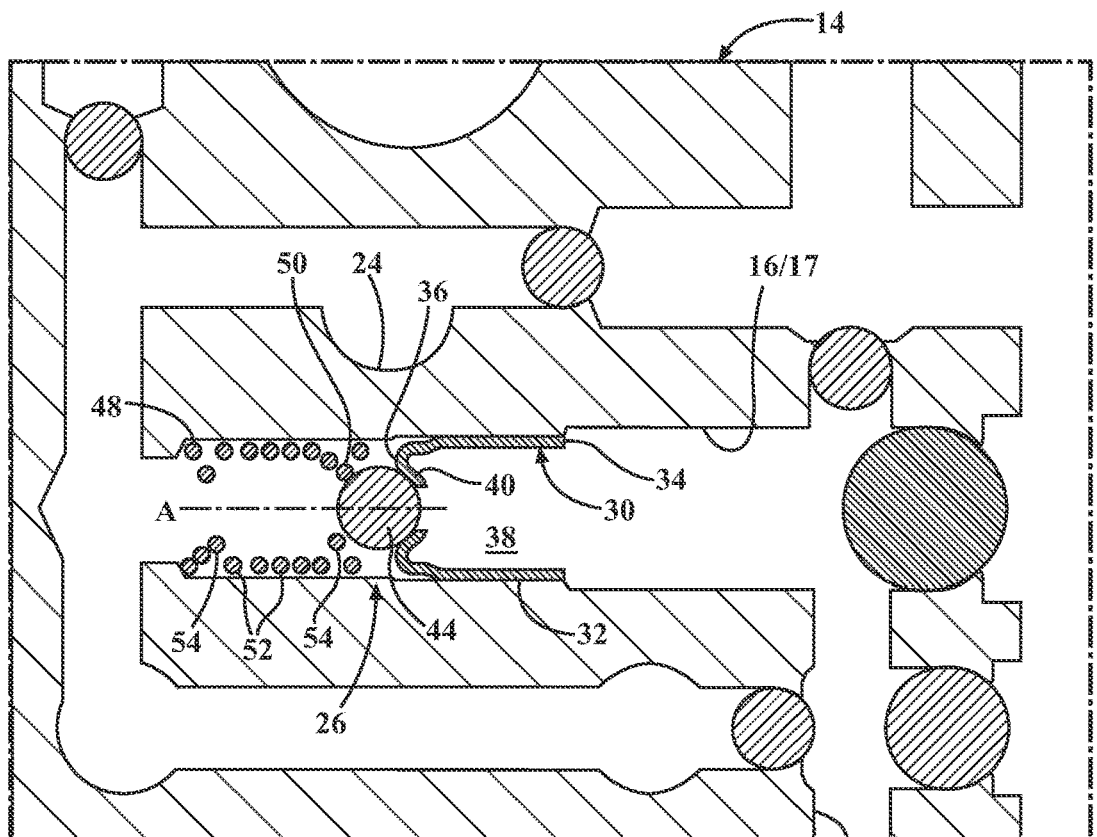
FIG. 2 is a side, cross-sectional view of an embodiment of the hydraulic control unit illustrating a blow-off metering valve.
Figure 3:
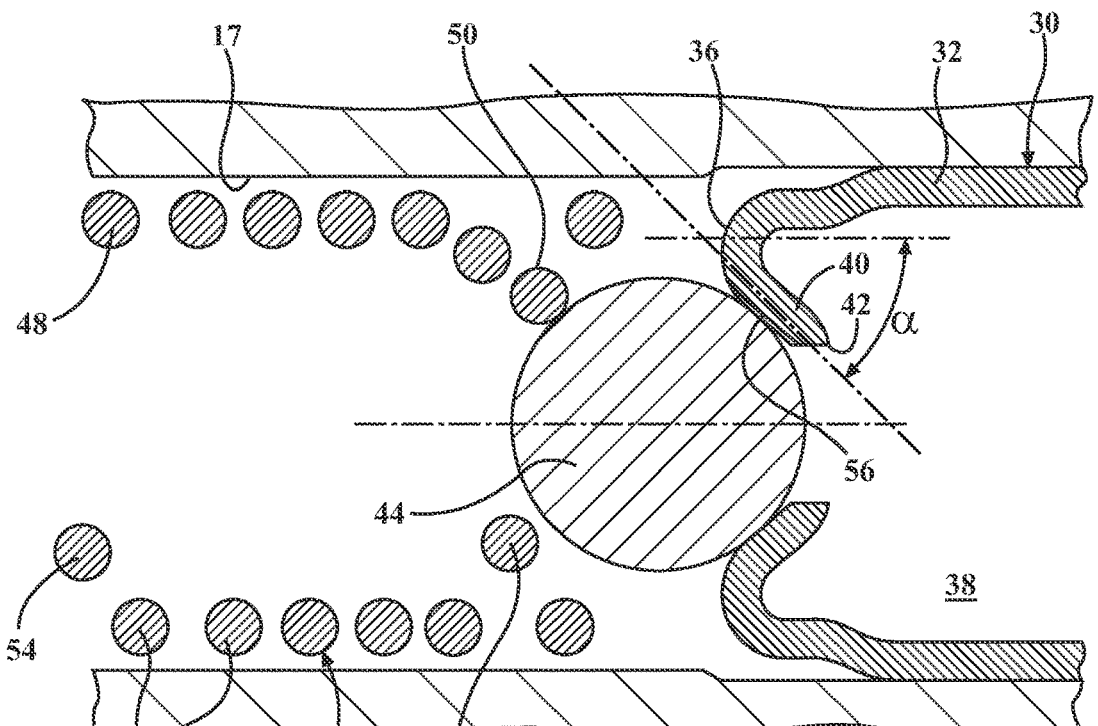
FIG. 3 is a magnified view of the blow-off metering valve of FIG. 2.

With reference to FIGS. 2-4, the blow-off metering valve 26 includes a valve seat 30 that is press-fit or otherwise secured in the bore 16. The valve seat 26 includes a generally sleeve-shaped wall 32 that extends about an axis A and extends axially between a first end 34 and a second end 36. The wall 32 defines a passage 38 that extends axially between the first and second ends 34, 36 for transmitting a fluid (e.g., brake fluid) through the valve seat 30.

The valve seat 30 further includes an annular flange 40 that extends in the axial direction from the second end 36 of the wall 32 toward the first end 34 of the wall 32 and tapers radially inwardly. More particularly, as shown, the second end 36 of the wall 32 is drawn/bent at the interface of the wall 32 and annular flange 40 such that the interface is arc-shaped. The annular flange 40 terminates at a distal end 42 that is radially spaced from the wall 32. In other words, a gap is provided between the annular flange 40 and the wall 32, thus providing a simple, light-weight and easy to assemble arrangement of the valve seat 30 because the wall 32 may easily be bent during production to provide the annular flange 40. Furthermore, as illustrated in FIG. 3, the annular flange 40 tapers radially inwardly at approximately a 45 degree angle a relative to the wall 32 such that it may receive and partially envelope a blocking member 44.

As shown in FIGS. 2-5A, the blocking member 44 is axially aligned with the annular flange 40 and is axially movable toward and away from the annular flange 40 for creating a seal to inhibit the flow of fluid through the passage 38 of the valve seat 30 when the blocking member 44 engages the annular flange 40. According to the example embodiment, the blocking member 44 is a spherical-shaped ball, but other styles of blocking members, e.g., poppets, may be used without departing from the scope of the subject disclosure. As can be seen, because the annular flange tapers radially inwardly at approximately a 45 degree angle α, it partially envelopes the blocking member 44 and funnels the blocking member 44 into a centered position along the axis A.

The blow-off metering valve 26 further includes a biasing element 46 that biases the blocking member 44 toward the annular flange 40. According to the example embodiment, the biasing element 46 is a compression spring, however, other types of biasing elements 46 may be used, e.g., elastic members, without departing from the scope of the subject disclosure. The biasing element 46 extends between a fixed region 48 and a biasing region 50, with the fixed region 48 connected to the inner wall 17 of the housing 14, and the biasing region 50 engaging the blocking member 44 for biasing the blocking member 44 toward the annular flange 40 of the valve seat 30 for creating a seal to substantially prevent the fluid from passing the blocking member 44 when the blocking member 44 engages the annular flange 40. According to the example embodiment, the biasing element 46 is a compression spring 46 that includes a plurality of windings 52, 54, with the windings 52, 54 being comprised of a plurality of outer windings 52 and a plurality of inner windings 54. As shown, the outer windings 52 have a larger radius than the inner windings 54. This arrangement of outer and inner windings 52, 54 eliminates spring stack and allows fluid to more easily pass through the spring 46 because of the axially and radially spaced relationship of the windings 52, 54 relative to one another. The elimination of spring stack protects a modulator and other components from damage in the event of large displacement of the blocking member 44 during high pressure scenarios (discussed further below).

As further shown, at least one of the inner windings 54 engages the blocking member 44, and at least one of the outer windings 52 extends about the blocking member 44, with the outer winding 52 that extends about the blocking member 44 located axially closer to the second end of the wall 36 than the inner winding 54 that engages the blocking member 44. This arrangement centers the blocking member 44 on the valve seat 30 along the axis A while also preventing spring stack and allowing better flow of fluid. FIGS. 2-4 in particular illustrate how the blocking member 44 sits centered in the annular flange 40 over the passage 38 due to the angle of the annular flange 40 and inner windings 54, and illustrates how the outer windings 52 keep the biasing element 46 centered.

As best shown in FIG. 3, 5A-5B and 6A-6B, the annular flange 40 defines at least one flow channel 56 that extends axially for allowing fluid to bypass the blocking member 44 when the blocking member 44 engages the annular flange 40 such that at low pressures, a desired amount of fluid is able to flow though the blow-off metering valve 26. According to the example embodiment, a single flow channel 56 is provided, however it should be appreciated that any number of flow channels 56 could be used without departing from the scope of the subject disclosure (see, e.g., an extra flow channel 56 shown in in FIG. 6A). In the event that multiple flow channels 56 are used, they may be symmetrically spaced from one another to provide stable flow around the blocking member 44. As further shown, in the example embodiment, the flow channel 56 extends the entire length of the annular flange 40 from the second end 36 of the valve seat 30 to the distal end 42 of the annular flange 40, however other lengths could be used. As also shown, the flow channel 56 is radially and axially aligned with the blocking member 44 when the blocking member 44 engages the annular flange 40 such that it allows the fluid to bypass the blocking member 44. As best shown in FIG. 5B, the flow channel 56 may be produced via a coining operation such that a cross-section of the flow channel includes three faces 58 that are substantially perpendicular to one another to generally define a U-shape, however other shapes could be used. It should be appreciated that the arrangement of the drawn/bent annular flange 40 and coined flow channel 56 underneath the blocking member 44 reduce the complexity and cost of the design. The arrangement of the drawn/bent annular flange 40 and shape of the flow channel 40 which may be formed via a simple coining operation are important for cost reductions, design for manufacturing and flow stability.

During operation, the flow channel 56 of the blow-off metering valve 26 functions as an orifice, allowing a pre-determined amount of fluid to bypass the blocking member 44 when the differential pressure is below a set threshold. When the differential pressure exceeds a predetermined threshold, the pressure causes the blocking member 44 to overcome the biasing element 46, thus opening the passage 38 and allowing increased flow. In other words, orifice flow is provided through the flow channel 56 during low speed/low flow pressure build events when noise is critical, and the blocking member 44 opens during high speed/high pressure events to reduce restriction when the system requires higher flow.

Figure 7B:
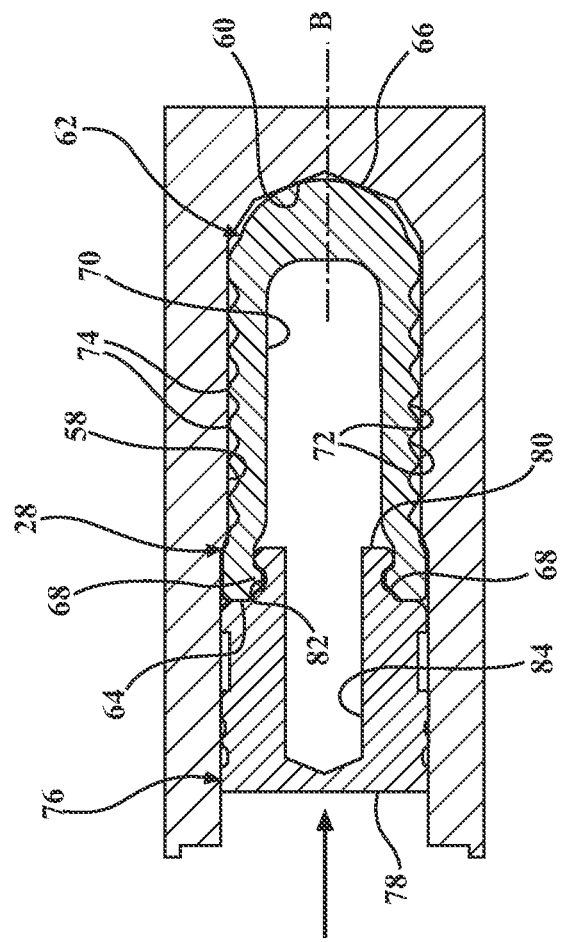
FIG. 7B is a side cross-sectional view of the damper assembly received by an attenuation recess of the housing of the hydraulic control unit.
Figure 7A:
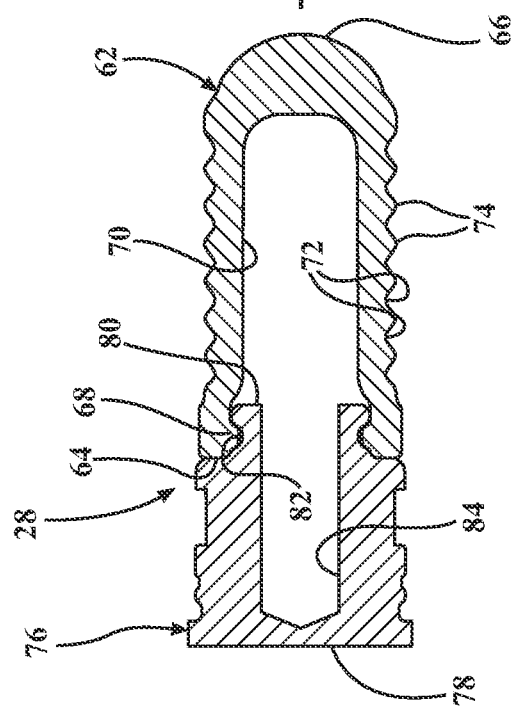
FIG. 7A is a side cross-sectional view of a damper assembly of the hydraulic control unit illustrating a body of the damper assembly coupled with a plug of the damper assembly.

As best shown in FIGS. 7A-7B, the housing 14 further defines an attenuation recess 58 that extends from the bore 16 and terminates at a distal wall 60. The attenuation recess 58 is fluidly connected to the bore 16 and receives the damper assembly 28. As shown, the damper assembly 28 includes a body 62 that generally has a cup-shape and extends along an attenuator axis B between an open end 64 and a closed end 66, with the closed end 66 disposed adjacent to the distal wall 60 of the attenuation recess 58. The body 62 is of a rubber material such that it may absorb pressure pulses during pump 20 strokes and to maintain the pressure through the blow-off metering valve 26 during a return stroke. As such, it reduces pressure prior of fluid prior to entry into the blow-off metering valve 26 in a tunable pressure range. The rubber geometry is critical to be able to provide adequate stiffness and extend the pressure range in the zone where the body 62 of the damper assembly 28 is effective. The body 62 presents an annular connecting flange 68 that extends radially inwardly adjacent to the open end 64. The body 62 defines an axially extending cavity 70 for receiving the fluid. The body 62 further defines a plurality of circumferentially extending grooves 72 that are spaced axially from one another to present a plurality of axially spaced ribs 74 such that fluid entering the cavity 70 causes axial deflection of the body 62 and radial expansion of the body 62 for providing a damping effect. The damper assembly 28 further includes a plug 76 that is sealingly received by the cavity 70 of the body 62. The plug 76 generally has a sleeve shape and extends axially between a closed end 78 and an open end 80. The plug 76 defines a circumferential groove 82 adjacent to the open end 80 that removeably receives the connecting flange 68 of the body 62 for securing the body 62 to the plug 76. The plug 76 further defines at least one fluid passage 84 for allowing fluid to pass from the bore 16 of the housing 14 into the cavity 70 of the body 62. The arrangement of the groove 82 and connecting flange 68 provides for improved retention of the plug 76 to the body 62 as the connecting flange 68 prevents the plug 76 and body 62 from becoming disconnected during handling. The arrangement of the groove 82 and connecting flange 68 also provides ease of assembly, as the plug 76 and body 62 may be pre-assembled prior to connection to the housing 10.

In view of the foregoing, due to the blow-off metering valve 26 and damper assembly 28, the system is effective at reducing low frequency pump noises. Furthermore, the overall design is small enough such that it can be press fit in a bore 16 and sealed with a standard low-cost blocking member 44.

Obviously, many modifications and variations of the present invention are possible in light of the above teachings and may be practiced otherwise than as specifically described while within the scope of the appended claims. Notably, features of the embodiments described herein may be used in conjunction with one another in various combinations.

What is claimed is:

1. A blow-off metering valve for a hydraulic control unit assembly of a brake system of a vehicle for reducing noise from a pump, comprising:
   a valve seat for being located in a bore of the hydraulic control unit assembly, the valve seat including a wall generally having a sleeve shape and extending about an axis and extending axially between a first end and a second end;
   the wall defining a passage extending axially between the first and second ends for transmitting a fluid through the valve seat;

an annular flange extending axially from the second end of the wall toward the first end of the wall and tapering radially inwardly to define an annular flange;

a blocking member axially aligned with the annular flange and axially movable toward and away from the annular flange for creating a seal to inhibit the flow of fluid through the passage of the valve seat when the blocking member engages the annular flange;

a biasing element biasing the blocking member toward the annular flange;

the annular flange terminating at a distal end being radially spaced from the wall; and the annular flange defining at least one flow channel for allowing fluid to bypass the blocking member when the blocking member engages the annular flange;

wherein the biasing element is a compression spring including a plurality of windings, wherein the plurality of windings includes a plurality of outer windings and a plurality of inner windings, and wherein the outer windings have a larger radius than the inner windings for eliminating spring stack and allowing fluid to more easily pass through the spring;

wherein the blocking member is a ball, wherein at least one of the inner windings engages the ball, and wherein at least one of the outer windings extends about the ball for centering the ball on the valve seat.

2. A blow-off metering valve as set forth in claim 1, wherein the at least one flow channel extends from the second end of the valve seat to the distal end of the annular flange.

3. A blow-off metering valve as set forth in claim 1, wherein the at least one flow channel of the annular flange is radially and axially aligned with the blocking member when the blocking member engages the annular flange.

4. A blow-off metering valve as set forth in claim 1, wherein a cross-section of the at least one flow channel includes three walls each being substantially perpendicular to one another.

5. A blow-off metering valve as set forth in claim 1, wherein an interface of the annular flange and the wall at the second end is arc-shaped.

6. A blow-off metering valve as set forth in claim 1, wherein the annular flange tapers radially inwardly at approximately a 45 degree angle relative to the wall.

7. A blow-off metering valve as set forth in claim 1, wherein the at least one of the outer windings extending about the ball is located axially closer to the second end of the wall than the at least one of the inner windings engaging the ball.

8. A blow-off metering valve for a hydraulic control unit assembly of a brake system of a vehicle for reducing noise from a pump, comprising:

a valve seat for being located in a bore of the hydraulic control unit assembly, the valve seat including a wall generally having a sleeve shape and extending about an axis and extending axially between a first end and a second end;

the wall defining a passage extending axially between the first and second ends for transmitting a fluid through the valve seat;

an annular flange extending axially from the second end of the wall toward the first end of the wall and tapering radially inwardly to define an annular flange;

a blocking member axially aligned with the annular flange and axially movable toward and away from the annular flange for creating a seal to inhibit the flow of fluid through the passage of the valve seat when the blocking member engages the annular flange;

a compression spring biasing the blocking member toward the annular flange, the compression spring including a plurality of windings, wherein the plurality of windings include a plurality of outer windings and a plurality of inner windings, wherein the outer windings have a larger radius than the inner windings for eliminating spring stack and allowing fluid to more easily pass through the spring;

wherein the blocking member is a ball, wherein at least one of the inner windings engages the ball, and wherein at least one of the outer windings extends about the ball for centering the ball on the valve seat.

9. A blow-off metering valve as set forth in claim 8, wherein the at least one of the outer windings extending about the ball is located axially closer to the second end of the wall than the at least one of the inner windings engaging the ball.

10. A blow-off metering valve as set forth in claim 8, wherein the annular flange terminates at a distal end being radially spaced from the wall.

11. A blow-off metering valve as set forth in claim 8, wherein the annular flange defines at least one flow channel extending axially for allowing fluid to bypass the blocking member when the blocking member engages the annular flange.

12. A blow-off metering valve as set forth in claim 11, wherein the at least one flow channel extends from the second end of the valve seat to the distal end of the annular flange.

13. A blow-off metering valve as set forth in claim 11, wherein the at least one flow channel of the annular flange is radially and axially aligned with the blocking member when the blocking member engages the annular flange.

14. A blow-off metering valve as set forth in claim 11, wherein a cross-section of the at least one flow channel includes three walls each being substantially perpendicular to one another.

15. A blow-off metering valve as set forth in claim 8, wherein an interface of the annular flange and the wall at the second end is arc-shaped.

16. A blow-off metering valve as set forth in claim 8, wherein the annular flange tapers radially inwardly at approximately a 45 degree angle relative to the wall.

17. A hydraulic control unit assembly for controlling hydraulic brake pressure at a brake cylinder, comprising:

a housing defining at least one bore defined by an inner wall extending between an inlet and an outlet, wherein the inlet is for being connected with a pump, and wherein the outlet is for being connected to a brake cylinder;

a blow-off metering valve for reducing noise from the pump located in the bore, the blo-off metering valve including:

a valve seat for being located in a bore of the hydraulic control unit assembly, the valve seat including a wall generally having a sleeve shape and extending about an axis and extending axially between a first end and a second end;

the wall defining a passage extending axially between the first and second ends for transmitting a fluid through the valve seat;

an annular flange extending axially from the second end of the wall toward the first end of the wall and tapering radially inwardly to define an annular flange;

a blocking member axially aligned with the annular flange and axially movable toward and away from the annular flange for creating a seal to inhibit the flow of fluid through the passage of the valve seat when the blocking member engages the annular flange;

a biasing element biasing the blocking member toward the annular flange;

the annular flange terminating at a distal end being radially spaced from the wall; and the annular flange defining at least one flow channel for allowing fluid to bypass the blocking member when the blocking member engages the annular flange;

wherein the biasing element is a compression spring including a plurality of windings, wherein the plurality of windings includes a plurality of outer windings and a plurality of inner windings, and wherein the outer windings have a larger radius than the inner windings for eliminating spring stack and allowing fluid to more easily pass through the spring, wherein the blocking member is a ball, wherein at least one of the inner windings engages the ball, and wherein at least one of the outer windings extends about the ball for centering the ball on the valve seat.

\* \* \* \* \*